United States Patent
St. Pierre et al.

(10) Patent No.: US 9,720,481 B2
(45) Date of Patent: Aug. 1, 2017

(54) ENERGY-SAVING MODE FOR A RAIL SYSTEM SIGNALING SYSTEM

(71) Applicant: SIEMENS AKTIENGESELLSCHAFT, Munich (DE)

(72) Inventors: Andreas St. Pierre, Meine (DE); Christian Steffens, Evessen (DE); Matthias Saeuberlich, Braunschweig (DE)

(73) Assignee: Siemens Aktiengesellschaft, Munich (DE)

( * ) Notice: Subject to any disclaimer, the term of this patent is extended or adjusted under 35 U.S.C. 154(b) by 66 days.

(21) Appl. No.: 14/428,428

(22) PCT Filed: Sep. 5, 2013

(86) PCT No.: PCT/EP2013/068339
§ 371 (c)(1),
(2) Date: Mar. 16, 2015

(87) PCT Pub. No.: WO2014/040898
PCT Pub. Date: Mar. 20, 2014

(65) Prior Publication Data
US 2015/0241948 A1    Aug. 27, 2015

(30) Foreign Application Priority Data
Sep. 14, 2012   (DE) ........................ 10 2012 216 382

(51) Int. Cl.
*G06F 1/32* (2006.01)
*B61L 7/08* (2006.01)
(Continued)

(52) U.S. Cl.
CPC .............. *G06F 1/3234* (2013.01); *B61L 7/08* (2013.01); *B61L 15/0063* (2013.01); *B61L 27/0066* (2013.01); *G06F 1/3287* (2013.01)

(58) Field of Classification Search
CPC ........ G06F 1/3234; G06F 1/3287; B61L 7/08; B61L 15/0063; B61L 27/0066
See application file for complete search history.

(56) References Cited

U.S. PATENT DOCUMENTS

2002/0095589 A1   7/2002  Keech
2002/0199015 A1   12/2002 Tari et al.
(Continued)

FOREIGN PATENT DOCUMENTS

DE          4407860 C1      4/1995
DE      102011075652 A1    11/2012
(Continued)

*Primary Examiner* — Stefan Stoynov
(74) *Attorney, Agent, or Firm* — Laurence Greenberg; Werner Stemer; Ralph Locher

(57) ABSTRACT

In order to save energy, it is proposed that parts of a signaling system be switched off, for example, by an operating system. The computers to be switched off store data which are relevant to railway safety, preferably on a central storage medium, for example, an NAS hard drive. When they have been reactivated, the computers read the safety-relevant data and operation can continue. This solution also enables computers which work with data relevant to railway safety to be switched to an energy-saving mode without endangering the safety of the railway.

16 Claims, 2 Drawing Sheets

(51) Int. Cl.
   *B61L 15/00*   (2006.01)
   *B61L 27/00*   (2006.01)

(56) References Cited

U.S. PATENT DOCUMENTS

| | | | |
|---|---|---|---|
| 2003/0182415 A1* | 9/2003 | Vicard | G06F 1/3209 709/223 |
| 2004/0193863 A1* | 9/2004 | Zimmer | G06F 9/4416 713/1 |
| 2009/0079560 A1* | 3/2009 | Fries | B61L 27/0088 340/539.22 |
| 2009/0164771 A1 | 6/2009 | Reece et al. | |
| 2014/0107874 A1 | 4/2014 | Temming | |

FOREIGN PATENT DOCUMENTS

| | | |
|---|---|---|
| EA | 004693 B1 | 6/2004 |
| EP | 1510430 A1 | 3/2005 |
| EP | 2253525 A1 | 11/2010 |
| RU | 2002114066 A | 12/2003 |
| RU | 51605 U1 | 2/2006 |
| RU | 2351084 C2 | 3/2009 |
| RU | 2443017 C1 | 2/2012 |
| WO | 2005018168 A1 | 2/2005 |
| WO | 2011107362 A1 | 9/2011 |

\* cited by examiner

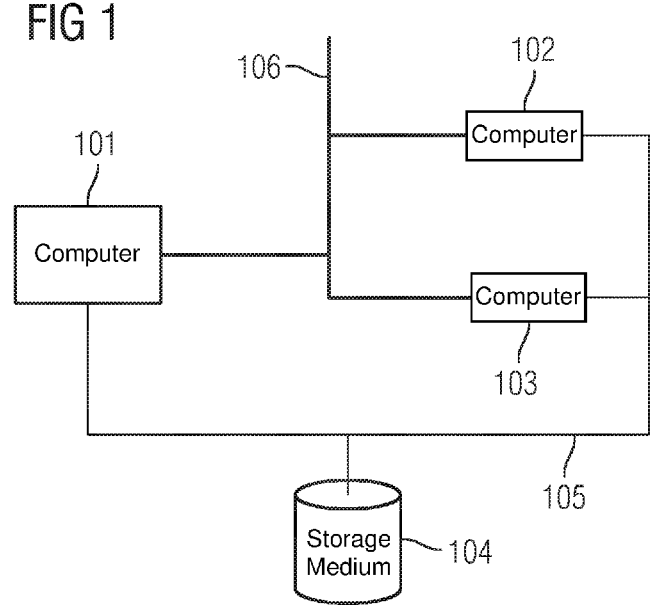
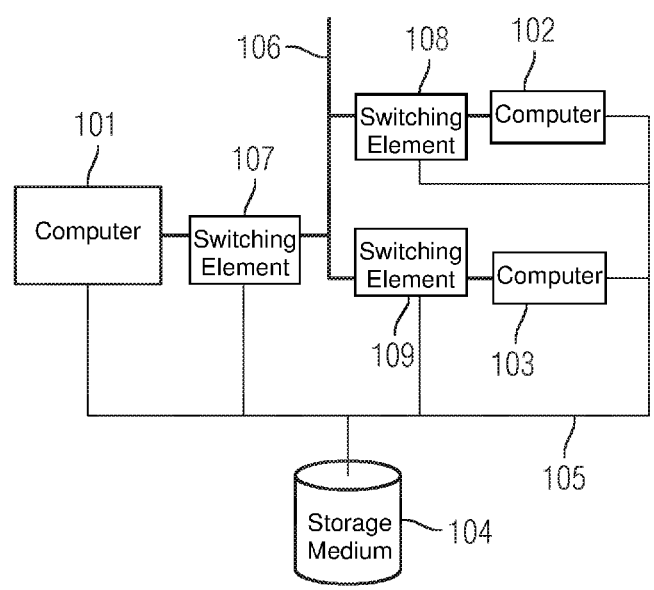

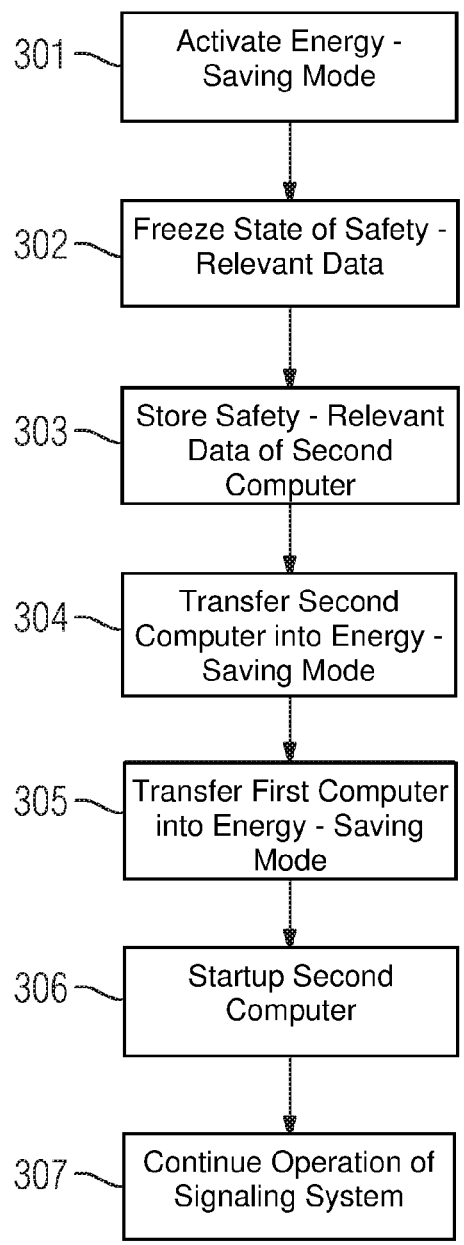

ENERGY-SAVING MODE FOR A RAIL SYSTEM SIGNALING SYSTEM

BACKGROUND OF THE INVENTION

Field of the Invention

The invention relates to a method for operating a rail system, in particular in an energy-saving mode and corresponding devices.

In principle, it is a drawback that computers of a signaling system, for example of a signal box, are not switched off and thus consume energy even if they are not required at all.

BRIEF SUMMARY OF THE INVENTION

The object of the invention is to avoid the aforementioned drawback and, in particular, to provide an effective way of operating a signaling system.

This object is achieved according to the features of the independent claims. Preferred embodiments are able to be derived, in particular, from the dependent claims.

To achieve the object, a method is proposed for operating a signaling system of a rail system,
  in which the signaling system comprises a first computer and at least one second computer,
  in which the first computer initiates the storage of safety-relevant data of the at least one second computer,
  in which the first computer initiates the transfer of the at least one second computer into an energy-saving mode.

The signaling system may comprise and/or be, for example, a signal box, a track control center for automatic train control systems such as a radio block center, a vehicle device of automatic train control systems, etc.

This approach permits computers in a signaling system, for example when they are not required, to be switched off at least partially (or fully) in order to save energy. During the switching-off process, safety-relevant data is stored so that after switching on the computers the same state may be created relative to this data as before the energy-saving mode was entered.

A development is that
  safety-relevant data of the first computer is stored,
  the first computer is transferred into an energy-saving mode.

An embodiment is that
  based on a wake-up signal the first computer is activated,
  the first computer restores its safety-relevant data.

In particular, it is a development that
  the first computer initiates an activation of the at least one second computer,
  the at least one second computer restores its safety-relevant data.

In particular, the first computer may initiate the re-reading by the at least one second computer of its previously stored safety-relevant data and/or the transfer of said data thereto.

A further development is that the energy-saving mode comprises the shutdown of the computer, in particular the switching-off of the computer.

A further development is that the switching-off of the computer comprises an interruption to a power supply which may be carried out, in particular, by means of a controllable switching element.

Within the context of an additional development, the controllable switching element may be activated via a network.

A further development is that the safety-relevant data of the first computer and/or the safety-relevant data of the at least one second computer is respectively stored on a common storage medium or on different storage media.

An embodiment is that the storage medium comprises at least one of the following components:
  a hard drive,
  a memory card,
  an internal memory,
  an external memory,
  a memory which is accessible via a network connection,
  a memory, in particular an NAS hard drive, connected to the power network.

An alternative embodiment is that the safety-relevant data respectively comprises at least some of the following information:
  closures of the rail system or of components of the rail system,
  specific instructions,
  closed lines,
  states of components of the rail operation,
  printed texts requiring acknowledgement,
  states of the first computer,
  states of the at least one second computer.

A further embodiment is that the first computer and the at least one second computer are connected to a (and/or via the) network, in particular the Ethernet or fiber-optic cable.

The first computer and/or the at least one second computer may be connected or coupled to the network via a cable or wirelessly.

A further embodiment is that the safety-relevant data is stored on at least one component which is connected to the network.

A development is that the first computer and/or the at least one second computer is a secure or protected computer.

For example, the access to the computer may be ensured in terms of construction and/or the computer may have at least one access control (for example, via software) which only permits access to the operation of the computer by authorized personnel.

A further embodiment is that the safety-relevant data is stored with a check sum.

The embodiments relating to the method accordingly apply to the other categories of claims.

The aforementioned object is also achieved by a device for the energy-saving operation of a signaling system of a rail system, wherein the device is designed such that it is able to initiate
  the storage of safety-relevant data of at least one second computer,
  the transfer of the at least one second computer into an energy-saving mode.

The device may be the "first computer" according to the present embodiments.

Moreover, the above object is achieved by means of a signaling system (for example a signal box) of a rail system comprising
  a first computer and at least one second computer,
  wherein the first computer is designed such that it is able to initiate
    the storage of safety-relevant data of the at least one second computer and
    the transfer of the at least one second computer into an energy-saving mode.

The solution set forth here further comprises a computer program product which is able to be directly loaded into a memory of a digital computer, comprising program code parts, which are suitable for carrying out steps of the method described here.

Moreover, the aforementioned problem is solved by means of a computer-readable storage medium, for example any memory comprising instructions able to be implemented by a computer (for example in the form of a program code) which are suitable for ensuring that the computer carries out steps of the method described here.

The properties, features and advantages of this invention described above, as well as the manner in which they are achieved, will be understood more clearly and more precisely in combination with the following schematic description of exemplary embodiments which are described in more detail in association with the drawings. In this case, for the sake of clarity, the same elements or similar-acting elements are provided with the same reference numerals.

BRIEF DESCRIPTION OF THE SEVERAL VIEWS OF THE DRAWING

In the drawings:

FIG. 1 shows a schematic block diagram for operating a signaling system, for example a signal box, in particular in an energy-saving mode;

FIG. 2 shows a schematic block diagram based on FIG. 1;

FIG. 3 shows a schematic flow diagram with steps for operating the signaling system.

DESCRIPTION OF THE INVENTION

For example, in a signaling system of a rail system, for example a signal box, at least one first computer (for example also a computer internetwork or a computer network; for the sake of simplicity reference is made hereinafter to the first computer, even when a plurality of first computers may actually be present and/or the first computer may be designed to be shared or may comprise a plurality of computers), which stores the states and/or state transitions of rail engineering components and/or of at least one second computer, for example for reasons of redundancy. Preferably, this computer has an interface with an operating system (for example an operating station).

In this case, a computer may comprise a computer system with at least one processor, at least one input/output interface and with at least one input unit (for example keyboard, mouse, touchscreen) and at least one output unit (for example display, display panel). Therefore, the computer may be designed, for example, as a workplace computer with operational software or designed as a subassembly. The computer generally has a connection to a power network, for example via a power supply unit and/or via an energy storage device (for example a battery).

The first computer may be instructed via the operating system to shut itself down or to shut down the at least one second computer and/or to switch into an energy-saving mode.

Preferably after such an instruction, no further operator controls are accepted.

Safety-relevant data is stored by the first computer, for example on a storage medium.

The safety-relevant data may in this case comprise at least some of the following information:

closures
specific instructions, closed lines,
states of components of the rail operation (for example signals, points),
printed texts requiring acknowledgement,
states of the first computer,
states of the at least one second computer.

In principle, the safety-relevant data may also comprise data and information, optionally also programs, which are important for the rail operation and/or the function of the rail operation.

The storage medium may be an internal or external storage medium of the first computer.

For example, the storage medium may be or comprise:

a hard drive,
a memory card,
an internal memory,
an external memory,
a memory which is accessible via a network connection,
a memory (NAS: "Network Attached Storage"), for example an NAS hard drive, connected to the power network.

Preferably, the first computer has an interface with a network, for example an Ethernet interface via which it is able to access the memory.

Advantageously, the first computer is a "secure" computer, i.e. a computer which is operated, for example, in a protected environment with protected programs. For example, access to the computer may be protected in terms of construction (for example by the computer being arranged in a space for which access control is provided) and/or the computer may have at least one access control (password, chip card, retina scanner), which only permits access to the operation of the computer by authorized personnel.

An advantageous implementation provides that the safety-relevant data is fully or partially provided with a checksum (also referred to as check value or check code), so that transmission errors may be identified (for example before storage and/or during storage and/or when read). In principle, the checksum ensures or enhances data integrity when transferring or storing data.

After storing the safety-relevant data, the first computer initiates the change to a power-saving mode and/or the shut-down of at least one part of the at least one second computer. Thus, for example, the first computer may instruct at least one of a plurality of second computers to change to power-saving mode. It is also possible for the first computer to initiate the shut-down or change to power-saving mode for just one part of a second computer, wherein a different part of the second computer remains active and continues its operation.

Optionally, the first computer may initiate the interruption to the power supply to the at least one second computer, for example via a switching element which may be designed as a bistable relay, after the at least one second computer has entered the power-saving mode and/or after the at least one second computer has been shut down. It should be mentioned here that for each switching element one or more computers may be cut off from a power network or connected thereto. In particular, a plurality of switching elements may be provided, for example one per computer. The switching element may be controlled, for example, via a signal from a network: for example the switching element has a connection to the network (optionally also via a wireless connection) so that the switching state thereof is able to be controlled via this connection.

For example, the switching element may be designed as a switch-off relay, which may be instructed via a network connection to interrupt the power supply. The activation of the switch-off relay may take place via a WAKE-ON-LAN signal, whereupon the switch-off relay reinstates the power supply.

In principle, an alternative or additional embodiment is that the first computer is also transferred into a power-saving mode. Preferably this takes place—insofar as it is provided and desirable—after the first computer has initiated the transfer of the at least one second computer into the power-saving mode.

Thus the first computer may shut itself down after storing the safety-relevant data which is present thereon. Optionally, the power supply to the first computer may also be interrupted, for example via the (or a further) switching element. A further option is that the first computer may be switched off and reactivated via a WAKE-ON-LAN signal. This option accordingly also exists for the at least one second computer.

Thus the first and the at least one second computer may efficiently be shifted into an energy-saving state. This is advantageous, for example, if the computer is not required. In this manner, energy consumption may be reduced, for example, in the signal box.

A reactivation of the first computer and/or at least one second computer takes place accordingly: for example, the switching element which produces the power supply for the first computer may be switched on. Alternatively, the first computer may be activated by means of a WAKE-ON-LAN signal. Then the first computer is started (booting of the first computer).

The first computer may load the most recently stored safety-relevant data via operator control or automatically (for example via batch operation or macro), for example from the network hard drive. The first computer activates the at least one second computer, for example, via a WAKE-ON-LAN signal on the at least one second computer or by activating the (at least one) switching element which creates the power supply to the at least one second computer. The at least one second computer is booted. After being booted, the at least one second computer receives its safety-relevant data, for example, from the first computer. For example, the first computer, whether upon request or not upon request from the at least one second computer, is able to transfer the safety-relevant data thereto or the at least one second computer reads the safety-relevant data from the first computer or from the storage medium, for example the network hard drive.

Here it is advantageous, in particular, for different safety-relevant data in rail operation to be able to be stored by a secure method by the computer on a mass storage memory via operator control. Preferably, the mass storage memory itself is secured and/or designed to be redundant. Thus the computer may be switched off or enter an energy-saving mode by only one further reactivation interface being optionally active (for example via the aforementioned WAKE-ON-LAN signal). After restarting the computer, the safety-relevant data is loaded and the operation may be continued.

FIG. 1 shows a schematic block diagram for operating a signaling system, for example a signal box, in particular in an energy-saving mode.

A computer 101 is connected via a network 105 to a computer 102 and to a computer 103. The two computers 102 and 103 are an example of the "at least one second computer", whilst the computer 101 is the "first computer" according to the above embodiments. A storage medium 104, for example an NAS hard drive, is also connected to the network 105. The network 105 is by way of example an Ethernet, i.e. a network based on an Ethernet specification or an Ethernet protocol.

Moreover, the computers 101 to 103 are connected to a power network 106.

FIG. 2 shows a schematic block diagram based on FIG. 1, which additionally comprises switching elements 107 to 109 which in each case also have a connection to the network 105 and thus may be controlled via the network 105. Thus the switching elements 107 may be switched on or switched off via the network 105, wherein in the switched-off state the respective computer connected via the switching element is not connected to the power network 106.

For example, the control of the switching elements 108 and 109 may be implemented by the computer 101. The switching element 107 (or the computer 101) may be activated by a further computer (not shown in FIG. 1 and FIG. 2).

FIG. 3 shows a schematic flow diagram with steps for operating the signaling system.

In a step 301, the first computer receives an instruction to activate the energy-saving mode. This may be implemented, for example, by a further computer, for example by a operator input or automatically, for example depending on a time and/or the anticipated arrival of a train.

In a step 302 it is optionally ensured (for example by the first computer) that no further operations or changes of state take place relative to the safety-relevant data so that the current state of the safety-relevant data is "frozen" and no further alterations to the safety-relevant data may be lost.

In a step 303 the safety-relevant data of the at least one second computer is stored on a storage medium, for example an NAS hard drive.

Optionally in step 303, the safety-relevant data of the first computer is also stored on the same storage medium or on a different storage medium.

In a step 304, the first computer initiates the transfer of the at least one second computer into the energy-saving mode. For example, the first computer may initiate the shut-down or switching-off of the at least one second computer, for example by means of a corresponding message via the network.

In an optional step 305, the first computer is also transferred into the energy-saving mode, i.e. it switches itself off or is switched off. If the first computer is to be reactivated, this takes place for example by switching on by means of a control action via a further computer, so that for example via a WAKE-UP-LAN signal the first computer is booted and/or reconnected to the power network 106 via a switching element (see reference numeral 107 in FIG. 2). After the first computer is rebooted, the safety-relevant data is restored.

In a step 306, the first computer initiates the start-up of the at least one second computer, for example by a WAKE-UP-LAN signal or via the activation of at least one switching element. The at least one second computer is booted and the safety-relevant data is restored.

Then the operation of the signaling system may be continued as before (see step 307).

Thus, in particular, it is proposed in order to save energy, to switch off parts of a signaling system, for example by operator control. The computers to be switched off store safety-relevant data for the rail operation, preferably on a central storage medium, for example an NAS hard drive. After the reactivation thereof, the computers read the safety-relevant data and the operation may be continued. By means of this solution, it is also possible to switch the computers which operate with safety-relevant data for the rail operation into an energy-saving mode, without at the same time risking the safety of the rail operation.

Although the invention in detail has been illustrated and described more specifically by the at least one exemplary embodiment shown, the invention is not limited thereto and other variants may be derived therefrom by the person skilled in the art, without departing from the protected scope of the invention.

LIST OF REFERENCE NUMERALS

| | |
|---|---|
| 101 | Computer ("first computer") |
| 102 | Computer ("second computer") |
| 103 | Computer ("second computer") |
| 104 | Storage medium, e.g. NAS hard drive |
| 105 | Network |
| 106 | Power network |
| 107 | Switching element |
| 108 | Switching element |
| 109 | Switching element |
| 301-307 | Steps of a method for operating a signaling system |

The invention claimed is:

1. A method for operating a signaling system of a rail system, which comprises the steps of:
providing the signaling system with a first computer and at least one second computer;
initiating, via the first computer, a storage of safety-relevant data of the at least one second computer externally from the at least one second computer;
initiating, via the first computer, a transfer of the at least one second computer into an energy-saving mode;
storing safety-relevant data of the first computer externally from the first computer; and
switching the first computer into the energy-saving mode.

2. The method according to claim 1, which further comprises activating the first computer based on a wake-up signal and the first computer loads the safety-relevant data.

3. The method according to claim 1, which further comprises initiating an activation of the at least one second computer via the first computer and the at least one second computer restores the safety-relevant data.

4. The method according to claim 1, wherein the energy-saving mode includes a shutting-down of the first and second computers by switching-off the first and second computers.

5. The method according to claim 4, wherein the switching-off of the first and second computers includes an interruption to a power supply which is carried out a controllable switching element.

6. The method according to claim 5, which further comprises activating the controllable switching element via a network.

7. The method according to claim 1, which further comprises storing at least one of the safety-relevant data of the first computer or the safety-relevant data of the at least one second computer on a common storage medium.

8. The method according to claim 7, which further comprises selecting the storage medium from the group consisting of a hard drive, a memory card, an internal memory, an external memory, a memory which is accessible via a network connection, a memory connected to a power network and a network attached storage hard drive connected to the power network.

9. The method according to claim 1, wherein the safety-relevant data of the first computer and the safety-relevant data of the second computer each contain at least one of:
information regarding closures of the rail system or of components of the rail system;
information regarding specific instructions;
information regarding closed lines;
information regarding states of components of a rail operation;
information regarding printed texts requiring acknowledgement;
information regarding states of the first computer; and
information regarding states of the at least one second computer.

10. The method according to claim 1, which further comprises connecting the first computer and the at least one second computer to a network.

11. The method according to claim 10, which further comprises storing the safety-relevant data on at least one component connected to the network.

12. The method according to claim 1, wherein at least one of the first computer or the at least one second computer is a secure or protected computer.

13. The method according to claim 1, which further comprises storing the safety-relevant data with a check sum.

14. The method according to claim 1, which further comprises storing at least one of the safety-relevant data of the first computer or the safety-relevant data of the at least one second computer on different storage media.

15. A device for an energy-saving operation of a signaling system of a rail system, the device comprising:
a first computer configured to initiate a storage of safety-relevant data of at least one second computer externally from the at least one second computer and to transfer the at least one second computer into an energy-saving mode;
said first computer having safety-relevant data, said first computer configured to be switched into an energy-saving mode after the safety relevant-relevant data of said first computer stored externally from said first computer a transfer of the at least one computer into an energy saving mode.

16. A signaling system of a rail system, comprising:
a first computer; and
at least one second computer;
said first computer configured to initiate a storage of safety-relevant data of the at least one second computer externally from the at least one second computer and to transfer the at least one second computer into an energy-saving mode;
said first computer having safety-relevant data, said first computer configured to be switched into an energy-saving mode after the safety relevant-relevant data of said first computer stored externally from said first computer.

* * * * *

UNITED STATES PATENT AND TRADEMARK OFFICE
CERTIFICATE OF CORRECTION

PATENT NO. : 9,720,481 B2
APPLICATION NO. : 14/428428
DATED : August 1, 2017
INVENTOR(S) : Andreas St. Pierre et al.

Page 1 of 1

It is certified that error appears in the above-identified patent and that said Letters Patent is hereby corrected as shown below:

In the Claims

Claim 15, Column 8, Lines 46-47 should read: "computer".

Signed and Sealed this
Twelfth Day of September, 2017

Joseph Matal
*Performing the Functions and Duties of the
Under Secretary of Commerce for Intellectual Property and
Director of the United States Patent and Trademark Office*